(12) United States Patent
Kobayashi et al.

(10) Patent No.: US 10,720,800 B2
(45) Date of Patent: Jul. 21, 2020

(54) BRUSHLESS MOTOR

(71) Applicant: SHINANO KENSHI KABUSHIKI KAISHA, Nagano (JP)

(72) Inventors: Hiroyuki Kobayashi, Nagano (JP); Katsutoshi Mizoguchi, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 370 days.

(21) Appl. No.: 15/647,927

(22) Filed: Jul. 12, 2017

(65) Prior Publication Data

US 2018/0062458 A1   Mar. 1, 2018

(30) Foreign Application Priority Data

Aug. 31, 2016   (JP) .................................. 2016-168678

(51) Int. Cl.

| H02K 1/06 | (2006.01) |
| H02K 1/14 | (2006.01) |
| H02K 29/03 | (2006.01) |
| H02K 21/22 | (2006.01) |
| H02K 7/106 | (2006.01) |
| H02K 1/27 | (2006.01) |

(52) U.S. Cl.
CPC ............. *H02K 1/146* (2013.01); *H02K 29/03* (2013.01); *H02K 1/2786* (2013.01); *H02K 7/106* (2013.01); *H02K 21/22* (2013.01); *H02K 2201/03* (2013.01); *H02K 2213/03* (2013.01)

(58) Field of Classification Search
CPC ...................................................... H02K 29/03
USPC .................................................... 310/216.092
See application file for complete search history.

(56) References Cited

U.S. PATENT DOCUMENTS

| 9,373,983 B2 * | 6/2016 | Noda ...................... H02K 29/03 |
| 2004/0245881 A1 * | 12/2004 | Kadoya .................. H02K 1/146 310/185 |
| 2009/0134733 A1 | 5/2009 | Matsubara et al. |

(Continued)

FOREIGN PATENT DOCUMENTS

| EP | 2 980 970 | 2/2016 |
| JP | 2006-280044 | 10/2006 |

OTHER PUBLICATIONS

Japanese Office Action dated Feb. 5, 2019 in corresponding Japanese Application No. 2016-168678.

(Continued)

*Primary Examiner* — Alexander Talpalatski
(74) *Attorney, Agent, or Firm* — Stephen J. Weyer, Esq.; Stites & Harbison, PLLC

(57) ABSTRACT

A stator core has first, second, and third pole teeth disposed circumferentially and projecting radially outward, the first pole teeth face rotor magnets and have symmetric tooth tips, the second and third pole teeth are circumferentially disposed adjacent to the first pole teeth and have asymmetric tooth tips, and a distance between the tooth tips of the second and third pole teeth is smaller than a distance between the tooth tips of the first and second pole teeth and the distance between the tooth tips of the first and third pole teeth. This apparently reduces the facing ratio between the stator pole teeth and the rotor magnetic poles and increases the cogging torque while preventing increase in cost and reduction in workability.

2 Claims, 3 Drawing Sheets

(56) References Cited

U.S. PATENT DOCUMENTS

| | | | |
|---|---|---|---|
| 2011/0050025 A1* | 3/2011 | Doushita | H02K 1/146 |
| | | | 310/198 |
| 2013/0214633 A1* | 8/2013 | Dajaku | H02K 29/03 |
| | | | 310/180 |
| 2015/0084475 A1 | 3/2015 | Ando et al. | |
| 2015/0340913 A1* | 11/2015 | Cho | F04D 17/08 |
| | | | 310/156.12 |

OTHER PUBLICATIONS

Europea Search Report dated Dec. 15, 2017 in corresponding European Application No. 17 18 3322.

\* cited by examiner

PRIOR ART

BRUSHLESS MOTOR

CROSS-REFERENCE TO RELATED APPLICATION

This application is based upon and claims the benefit of priority of the prior Japanese Patent Application No. 2016-168678, filed on Aug. 31, 2016, and the entire contents of which are incorporated herein by reference.

TECHNICAL FIELD

The present invention relates to a brushless motor used in, for example, HVAC (heating, ventilation, and air conditioning) devices.

BACKGROUND ART

The structure of the stator and rotor of, for example, a prior art outer rotor type three-phase DC brushless motor will be described with reference to FIG. 3.

The structure of a stator 1 will be described. A laminated core in which electromagnetic steel plates are laminated with each other is used as a stator core 4. A plurality of pole teeth 4a projects radially outward from the annular core body. A coil (not illustrated) is wound around each of the pole teeth 4a. The stator core 4 is press-bonded and assembled to the outer periphery of a bearing housing (not illustrated). A bearing is fitted into the bearing housing.

A rotor 8 integrally assembled by swaging a cup-shaped rotor yoke 12 with respect to the rotor hub fixed to one end of the rotor shaft. Annular rotor magnets 13 multipole-magnetized in the circumferential direction are assembled to the inner peripheral surface of the rotor yoke 12. After the stator 1 is assembled, the rotor 8 is fitted by passing the rotor shaft through the bearing of the bearing housing. At this time, assembly is performed so that the pole teeth 4a of the stator core 4 face the rotor magnets 13.

When the rotor is held in a constant position in the state in which the motor is not excited, the holding torque needs to be increased. For example, in the outer rotor type DC brushless motor illustrated in FIG. 3, the pole teeth 4a of the stator core 4 need to face the magnetic poles of the rotor magnets 13 on a one-to-one basis. However, since the disposition of the stator core 4 so as to face the rotor magnets 13 does not necessarily form a magnetic circuit, there is proposed a technique for increasing the holding torque by preparing an additional core other than the stator core 4 and causing the pole teeth to face the magnetic poles of the rotor magnets 13 on a one-to-one basis (see PTL 1: JP-A-2015-89327).

SUMMARY OF INVENTION

Technical Problem

However, when an additional core other than the stator core is provided as described in PTL 1, since the number of components increases and the additional core needs to be assembled to the housing in addition to the stator core, the size of the motor becomes larger in the shaft direction.

In addition, increase in cost or reduction in assembly workability may be caused due to added components of the motor.

Solution to Problem

The invention addresses these problems with an object of providing a brushless motor in which the facing ratio between the pole teeth and the rotor magnetic poles is apparently reduced only by changing the shapes of pole teeth of the stator core and the cogging torque is increased while preventing increase in cost or reduction in assembly workability due to added components.

The invention has the following structure to achieve the above object.

There is provided a brushless motor including a stator having a stator core including a plurality of stator pole teeth around which coils are wound, and a rotor having a rotor shaft rotatably supported via a bearing, the rotor shaft being provided at the center of a rotor yoke having a plurality of rotor magnets facing the stator pole teeth, in which the stator core has a plurality of first pole teeth, a plurality of second pole teeth, and a plurality of third pole teeth that are disposed in a circumferential direction and project radially, the stator pole teeth including the first pole teeth, the second pole teeth, and the third pole teeth, each of the first pole teeth faces one of the rotor magnets so as to be aligned with one of the magnetic pole, of the rotor magnets and has a tooth tip symmetric with respect to a shaft line in a radial direction, each of the second pole teeth and each of the third pole teeth are disposed adjacent to one of the first pole teeth in the circumferential direction and have tooth tips asymmetric with respect to shaft lines in the radial direction, and the distance between the tooth tips of each of the second pole teeth and each of the third pole teeth is smaller than the distance between the tooth tips of each of the first pole teeth and each of the second pole teeth and the distance between the tooth tips of each of the first pole teeth and each of the third pole teeth.

The first pole tooth having a tooth tip symmetric with respect to the shaft line in the radial direction of the stator core forms a magnetic circuit while facing the rotor magnet so as to be aligned with one of the magnetic poles of the rotor magnet. The second pole tooth and the third pole tooth disposed adjacent to the first pole tooth in the circumferential direction have tooth tips asymmetric with respect to the shaft lines in the radial direction and the distance between the tooth tips of the second pole tooth and the third pole tooth is smaller than the distance between the tooth tips of the first pole tooth and the second pole tooth and the distance between the tooth tips of the first pole tooth and the third pole tooth, so a magnetic attraction force acts between the tooth tips of the second pole tooth and the third pole tooth and the magnetic poles of the rotor magnets aligned with magnetic flux action surfaces thereof in addition to between the tooth tip of the first pole tooth and the magnetic pole of the rotor magnet.

Accordingly, by apparently reducing the total number of pole teeth of the stator core that form the magnetic circuit together with the magnetic poles of the rotor magnets, the cogging torque (holding torque) is increased without providing a core separately from the stator core. Accordingly, it is possible to increase the cogging torque of the brushless motor while preventing increase in cost or reduction in assembly workability due to added components.

Preferably, the total number of pole teeth of the stator core is reduced by assuming the second pole tooth and the third pole tooth to be a pseudo second pole tooth exerting a magnetic attraction force with respect to a plurality of the rotor magnetic poles facing the pseudo second pole tooth in addition to the first pole tooth exerting a magnetic attraction force with respect to the rotor magnetic pole facing the first pole tooth.

Specifically, when the number of magnetic poles of the rotor magnets is m (m is an integer equal to or more than 2), the total number of pole teeth of the stator core is P (P is an integer equal to or more than 3), and the total number of pole teeth of the first pole teeth and the pseudo second pole teeth is P', the cogging torque is increased by reducing P'/m to 1/2 when P/m is 3/4.

For example, although P/m is 3/4 when the total number of pole teeth of the stator core is 9 and the number of rotor magnetic poles is 12, since the total number P' of pole teeth of the first pole teeth and the pseudo second pole teeth is 6, P'/m is 1/2.

When the number of magnetic poles of the rotor magnets is m (m is an integer equal to or more than 2), the total number of pole teeth of the stator core is P (P is an integer equal to or more than 3), the total number of pole teeth of the first pole teeth and the pseudo second pole teeth is P', the cogging torque is also increased by reducing P'/m to 1/1 when P/m is 3/2.

For example, when the total number of pole teeth of the stator core is 9 and the number of rotor magnetic poles is 6, since P/m is 3/2 and the total number of pole teeth of the first pole teeth and the pseudo second pole teeth is 6, P'/m is 1/1.

Advantageous Effects of Invention

When the brushless motor described above is used, only if the shapes of pole teeth of the stator core are changed, the cogging torque of the brushless motor can be increased while preventing increase in cost or reduction in assembly workability due to added components by apparently reducing the facing ratio between the pole teeth and the magnetic poles of the rotor magnets.

DESCRIPTION OF EMBODIMENTS

An embodiment of a brushless motor according to the invention will be described with reference to the drawings. In the embodiment, descriptions are given using an outer rotor type three-phase DC brushless motor as an example.

Figure 1:
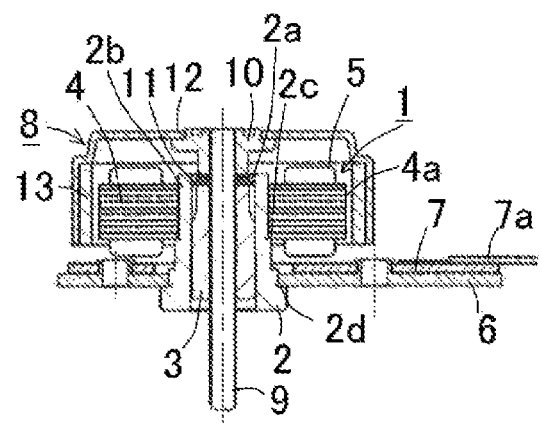
FIG. 1 is an explanatory diagram illustrating a cross section of an outer rotor type DC brushless motor taken along the shaft direction.

The schematic structure of the outer rotor type three-phase DC brushless motor will be described with reference to FIG. 1. The structure of a stator 1 will be described. A cylindrical metal oil retaining bearing 3 made of sintered metal is assembled concentrically to a shaft hole 2a of a housing 2 formed in a cylinder. A stator core 4 is bonded and fixed to a stepped part 2c along one end part 2b and the outer peripheral part of the housing 2 so that stator core 4 makes contact with the stepped part 2c. The stator core 4 is a laminated core in which a coil 5 is wound around each of pole teeth 4a1, 4a2, and 4a3 (see FIG. 2) projecting radially toward the outer periphery in plan view.

In addition, a large diameter stepped part 2d is formed in the outer periphery on the other end side of the housing 2 and a mount plate 6 is assembled to the stepped part 2d by press-fitting or swaging. A motor board 7 is fixed to the mount plate 6 and the motor board 7 is provided with a sensor board (not illustrated) on which hall elements and the like are mounted. Wiring 7a for supplying power is connected to the motor board 7.

Next, the structure of a rotor 8 will be described in FIG. 1. A rotor hub 10 formed by press work of a metal plate, which is made of brass or the like, is fixed to one side of a rotor shaft 9 by press-fitting. A cup-shaped rotor yoke 12 is assembled integrally to the rotor hub 10 by swaging. The rotary motion of the rotor 8 is supported by the metal oil retaining bearing 3 inserted into the cylindrical hole of the housing 2 through which the rotor shaft 9 passes. The vertical load of the rotor 8 is supported by a washer 11 provided between the rotor hub 10 and the metal oil retaining bearing 3.

The rotor yoke 12 is made of a magnetic substance. Annular rotor magnets 13 are assembled to the inner peripheral surface of the rotor yoke 12. The annular rotor magnets 13 are alternately multipole-magnetized in the circumferential direction by the north pole and the south pole. The length in the shaft direction of the rotor magnets 13 is larger than the length in the shaft direction of pole teeth 4a the stator core 4. After the stator 1 is assembled, the rotor 8 is inserted so that the rotor shaft 9 passes through the metal oil retaining bearing 3. At this time, assembly is performed so that the pole teeth 4a of the stator core 4 face the rotor magnets 13. The rotor 8 is assembled so that the rotor magnets 13 and the stator pole teeth 4a facing thereto are magnetically attracted each other and the rotor shaft 9 is rotatably supported by the housing 2 via the metal oil retaining bearing 3.

Next, the form of the stator core 4 will be described in detail with reference to FIGS. 2 and 4.

Figure 2:
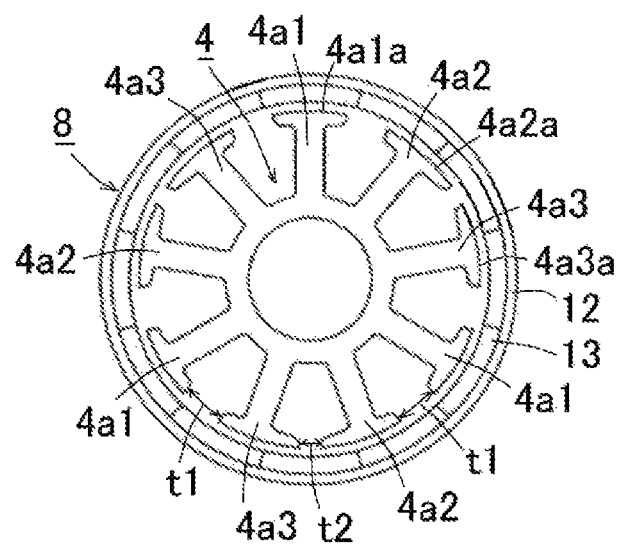
FIG. 2 is an explanatory diagram illustrating the structure of disposition of a stator core and a rotor in FIG. 1.

In FIG. 2, the rotor magnets 13 of the rotor 8 are alternately magnetized in the circumferential direction by the north pole and the south pole and the total number of magnetic poles is 12. In addition, the total number (number of poles) of pole teeth of the stator core 4 is nine (9 slots).

A total of nine poles (nine slots) of pole teeth 4a provided on the stator core 4 have the following shapes. As illustrated in FIG. 2, each of the first pole teeth 4a1 faces the rotor magnet 13 so as to be aligned with one (for example, the north pole) of the magnetic poles of the rotor magnet 13 and is formed symmetrically with respect to a shaft line in the radial direction. In addition, each of the second pole teeth 4a2 and each of the third pole teeth 4a3 disposed adjacent to the first pole tooth 4a1 in the circumferential direction are formed asymmetrically with respect to shaft lines in the radial direction and a distance t2 between the second pole tooth 4a2 and the third pole tooth 4a3 is smaller than a distance t1 between the first pole tooth 4a1 and the second pole tooth 4a2 and the distance t1 between the first pole tooth 4a1 and the third pole tooth 4a3 (t1>t2).

Figure 4A:
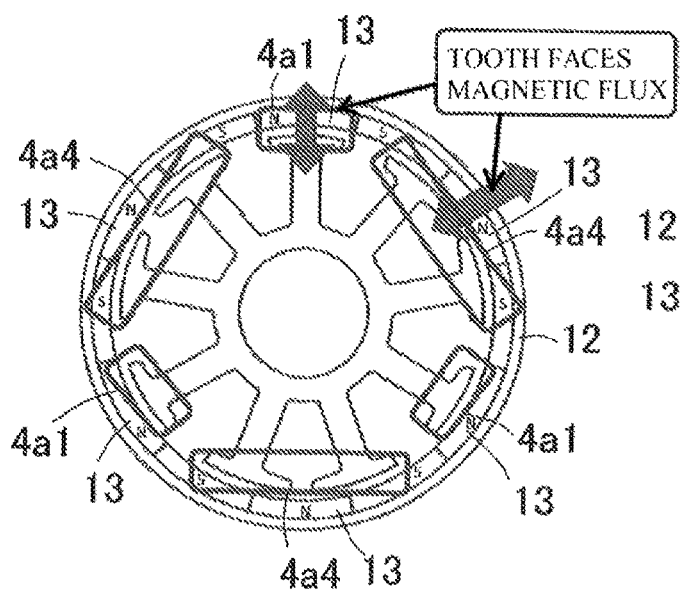
FIG. 4A is an explanatory diagram illustrating the layout of first pole teeth of the stator core in FIG. 2
Figure 4B:
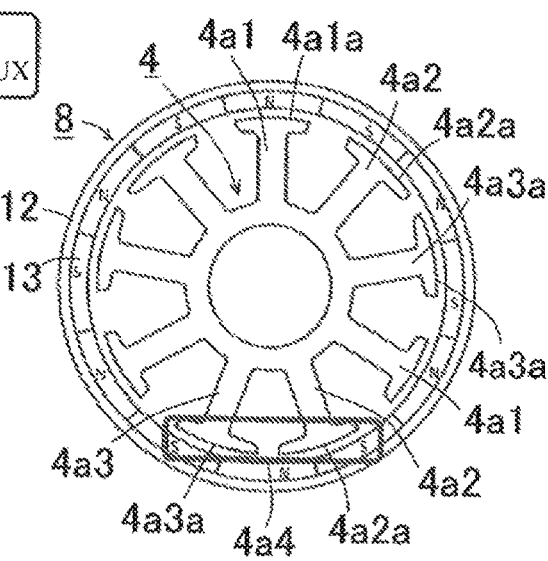
FIG. 4B is an exemplary diagram illustrating the layout of a pseudo second pole teeth of the stator core in FIG. 2.

That is, as illustrated in FIG. 4B, a tooth tip 4a 1a, which is the magnetic flux action surface of the first pole tooth 4a1, is symmetric with respect to the shaft line in the radial direction and faces the rotor magnet 13 so as to be aligned with the north pole of the rotor magnet 13 to exert an attraction force. In addition, a tooth tip 4a2a, which is the magnetic flux action surface of the second pole tooth 4a2, and a tooth tip 4a3a, which is the magnetic flux action surface of the third pole tooth 4a3, are asymmetric with respect to the shaft lines in the radial direction. The tooth tip 4a2a of the second pole tooth 4a2 and the tooth tip 4a3a of the third the pole tooth 4a3 are assumed to be a pseudo second pole tooth 4a4 that is equivalent to the single pole teeth 4a, so that an attraction force is exerted between the pseudo second pole tooth 4a4 and a plurality of rotor magnetic poles (for example, the south pole, the north pole and the south pole) facing each other (see FIG. 4B).

In FIG. 4A, when the number of magnetic poles of the rotor magnets 13 is m (m is an integer equal to or more than 2: m=12 in FIG. 4A) and the number of pole teeth of the stator core 4 is P (P is an integer equal to or more than 3: P=9 in FIG. 4A), the ratio P/m is 9/12 (=3/4).

However, when the second pole tooth 4a2 and the third the pole tooth 4a3 are assumed to be the pseudo second pole tooth 4a4, since the total number of pole teeth P' of the first pole teeth 4a (three teeth) and the pseudo second pole teeth 4a4 (three teeth) is six, the ratio P'/m is 6/12 (=1/2).

Figure 3:
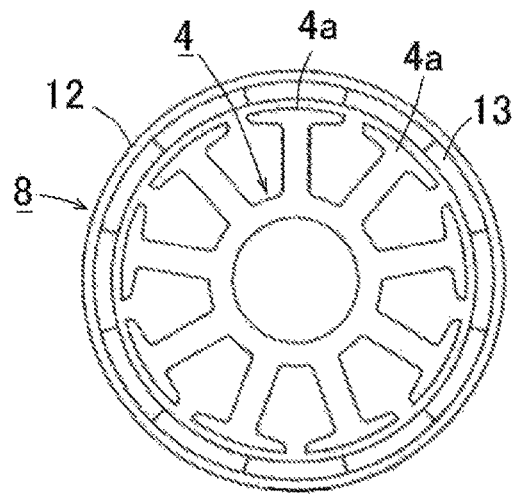
FIG. 3 is a comparison diagram illustrating the structure of disposition of a normal (prior art) stator core and a rotor of an outer rotor type DC brushless motor.
Figure 5A:
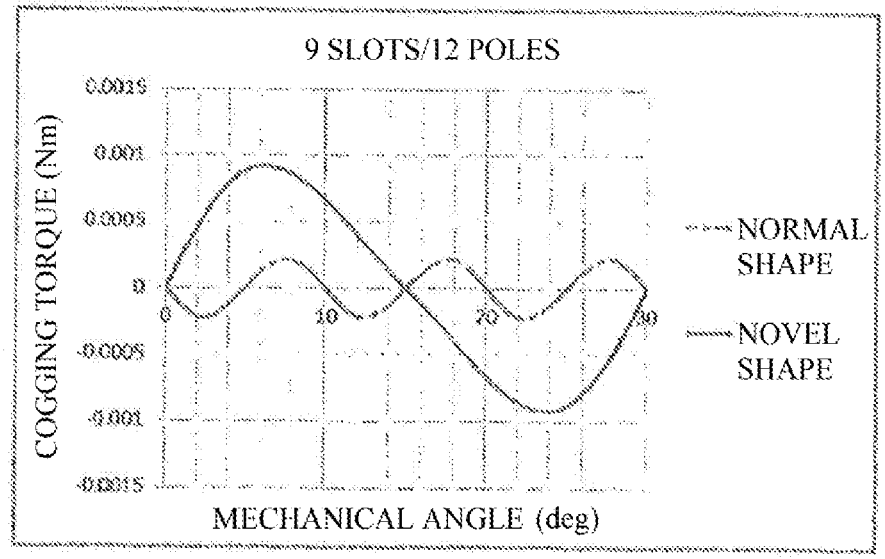
FIG. 5A is a graph for comparing changes in the cogging torques of a 9-slot and 12-pole brushless motor with changes in the cogging torques of a brushless motor having a normal stator core.

In the graph in FIG. 5A, changes (solid line) in the cogging torque with respect to the rotary angle of the stator core illustrated in FIGS. 4A and 4B are compared with changes (dot-dash line) in the cogging torque with respect to the rotary angle of a normal stator core illustrated in FIG. 3. It is found that the cogging torque is larger in the case of the shape illustrated in FIGS. 4A and 4B.

Figure 5B:
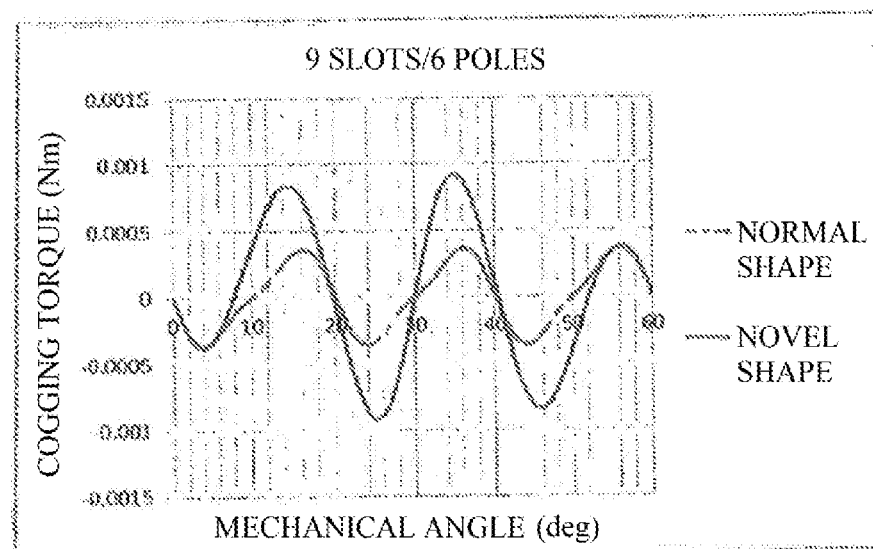
FIG. 5B is a graph for comparing changes in the cogging torques of a 9-slot and 6-pole brushless motor with changes in the cogging torques of a brushless motor having a normal stator core.

In addition, in FIG. 5B, changes (solid line) in the cogging torque with respect to the rotary angle of the stator core 4 are compared with changes (dot-dash line) in the cogging torque with respect to the rotary angle of the normal stator core illustrated in FIG. 3 when the number of magnetic poles of the rotor magnet is 6 (m=6) and the total number of pole teeth of the stator core 4 is (P=9, nine slots).

Although P/m equals 9/6 (=3/2), since the total number of pole teeth P' of the first pole teeth 4a1 (three teeth) and the pseudo second pole teeth 4a4 (three teeth) is 6, P'/m equals 6/6 (=1/1). It is found that the cogging torque is larger than in the normal stator core also in this case.

In addition, the above three-phase DC brushless motor is used as a driving source to hold the rotor in a predetermined position in HVAC (heating, ventilation, and air conditioning) devices or the like.

In addition, although the above embodiment has been described using an outer rotor type brushless motor as an example, the embodiment is applicable to an inner rotor type brushless motor by exchanging the positions of the rotor magnet and the stator core.

What is claimed is:

1. A brushless motor comprising:
a stator having a stator core including a plurality of stator pole teeth around which coils are wound; and
a rotor having a rotor shaft rotatably supported via a bearing, the rotor shaft being provided at the center of a rotor yoke having a plurality of rotor magnets facing the stator pole teeth,
wherein the stator core has a plurality of first pole teeth, a plurality of second pole teeth, and a plurality of third pole teeth that are disposed in a circumferential direction and project radially, the stator pole teeth including the first pole teeth, the second pole teeth, and the third pole teeth,
each of the first pole teeth faces one of the rotor magnets so as to be aligned with one of the magnetic poles of the rotor magnets and has a tooth tip symmetric with respect to a shaft line in a radial direction,
each of the second pole teeth and each of the third pole teeth are disposed adjacent to one of the first pole teeth in the circumferential direction and have tooth tips asymmetric with respect to shaft lines in the radial direction,
a distance between the tooth tips of each of the second pole teeth and each of the third pole teeth is smaller than a distance between the tooth tips of each of the first pole teeth and each of the second pole teeth and the distance between the tooth tips of each of the first pole teeth and each of the third pole teeth,
wherein the total number of pole teeth of the stator core is defined by considering each of the second pole teeth and each of the third pole teeth to be a pseudo second pole tooth exerting a magnetic attraction force with respect to a plurality of rotor magnetic poles facing the pseudo second pole teeth in addition to the first pole teeth exerting magnetic attraction forces with respect to the rotor magnetic poles facing the first pole teeth, and
the number of magnetic poles of the rotor magnets is m (m is an integer equal to or more than 2), the number of the pole teeth of the stator core is P (P is an integer equal to or more than 3), the number of pole teeth of the first pole teeth and the pseudo second pole teeth is P', the ratio P/m is 3/4, and P'/m is 1/2.

2. A brushless motor comprising:
a stator having a stator core including a plurality of stator pole teeth around which coils are wound; and
a rotor having a rotor shaft rotatably supported via a bearing, the rotor shaft being provided at the center of a rotor yoke having a plurality of rotor magnets facing the stator pole teeth,
wherein the stator core has a plurality of first pole teeth, a plurality of second pole teeth, and a plurality of third pole teeth that are disposed in a circumferential direction and project radially, the stator pole teeth including the first pole teeth, the second pole teeth, and the third pole teeth,
each of the first pole teeth faces one of the rotor magnets so as to be aligned with one of the magnetic poles of the rotor magnets and has a tooth tip symmetric with respect to a shaft line in a radial direction,
each of the second pole teeth and each of the third pole teeth are disposed adjacent to one of the first pole teeth in the circumferential direction and have tooth tips asymmetric with respect to shaft lines in the radial direction,
a distance between the tooth tips of each of the second pole teeth and each of the third pole teeth is smaller than a distance between the tooth tips of each of the first pole teeth and each of the second pole teeth and the distance between the tooth tips of each of the first pole teeth and each of the third pole teeth,
wherein the total number of pole teeth of the stator core is defined by considering each of the second pole teeth and each of the third pole teeth to be a pseudo second pole tooth exerting a magnetic attraction force with respect to a plurality of rotor magnetic poles facing the pseudo second pole teeth in addition to the first pole teeth exerting magnetic attraction forces with respect to the rotor magnetic poles facing the first pole teeth, and
the number of magnetic poles of the rotor magnets is m (m is an integer equal to or more than 2), the number of pole teeth of the stator core is P (P is an integer equal to or more than 3), the number of pole teeth of the first pole teeth and the pseudo second pole teeth is P', the ratio P/m is 3/2, and P'/m is 1/1.

\* \* \* \* \*